United States Patent [19]

Isozaki

[11] Patent Number: 5,191,489

[45] Date of Patent: Mar. 2, 1993

[54] METHOD FOR TRANSMITTING RECORD CONTROL SIGNALS AND RECORD CONTROL CIRCUIT

[75] Inventor: Masaaki Isozaki, Kanagawa, Japan

[73] Assignee: Sony Corporation, Japan

[21] Appl. No.: 397,401

[22] Filed: Aug. 23, 1989

[30] Foreign Application Priority Data

Aug. 30, 1988 [JP] Japan .................. 63-216023

[51] Int. Cl.⁵ .................................. G11B 5/02
[52] U.S. Cl. ......................................... 360/64
[58] Field of Search ............... 360/64, 68, 108, 67, 360/33.1

[56] References Cited

U.S. PATENT DOCUMENTS 4,814,902 3/1989 Fujiwara et al. ............. 360/33.1
4,926,273 5/1990 Tabuchi et al. ................. 360/64

FOREIGN PATENT DOCUMENTS

0237020 9/1987 European Pat. Off. .
0242502 12/1985 Japan .......................... 360/64
2191327 12/1987 United Kingdom .

Primary Examiner—Robert S. Tupper
Attorney, Agent, or Firm—Ronald P. Kananen

[57] ABSTRACT

The present invention is concerned with a magnetic recording apparatus, such as a video tape recorder, in which the recording circuit, provided with an amplifier connected to a magnetic head, is provided on the side of a rotary head drum. The record control signals for controlling the recording circuit are indicated by serial data and data enable signals indicating the data start and data end points of the serial data. The edge pulses of sync clocks of the serial data are gated by the data enable signals and connected to the serial data, and the transmission mode signals indicating the start and the end of the transmission are further annexed to serial transmission data to form serial control signals, which are then serially transmitted as record control signals from outside of the rotary head drum to the side of the rotary head drum from outside the rotary head drum for simplifying the transmission system for the record control signals.

4 Claims, 8 Drawing Sheets

RECORDING SYSTEM FOR DIGITAL VIDEO TAPE RECORDER

TRACK FORMAT

FIG. 5

ENCODER SETUP
FIG. 6

FIG. 7 ENCODER OPERATION

DECODER SETUP
FIG. 8

METHOD FOR TRANSMITTING RECORD CONTROL SIGNALS AND RECORD CONTROL CIRCUIT

BACKGROUND OF THE INVENTION

1. Field of the Invention

This invention relates to a method for transmitting record control signals to a recording circuit of a magnetic recording apparatus, in which the recording circuit provided with an amplifier connected to a magnetic head is provided on the side of a rotary head drum, and a record control circuit for controlling the operation of the recording circuit. The present invention may be applied to, for example, a video tape recorder provided with a rotary head drum.

2. Prior Art

In some of the magnetic recording/reproducing apparatus, such as a video tape recorder, provided with a rotary head drum, a recording amplifier and a reproducing amplifier or the like are provided within the rotary head drum in consideration that otherwise the frequency response or transmission efficiency by a rotary transformer provided between the magnetic head provided in the rotary head drum and the recording processing or reproducing processing circuit on the side of a fixed substrate may be lowered. In the magnetic recording/reproducing apparatus in which the recording amplifier, the reproducing amplifier and the like are provided in the rotary head drum, various control signals are transmitted with the aid of, for example, a slip ring device or an optical transmission system for performing switching control of the recording head within the rotary head drum, on-off control of the recording current and switching control of the reproducing head from outside the rotary head drum.

Figure 1:
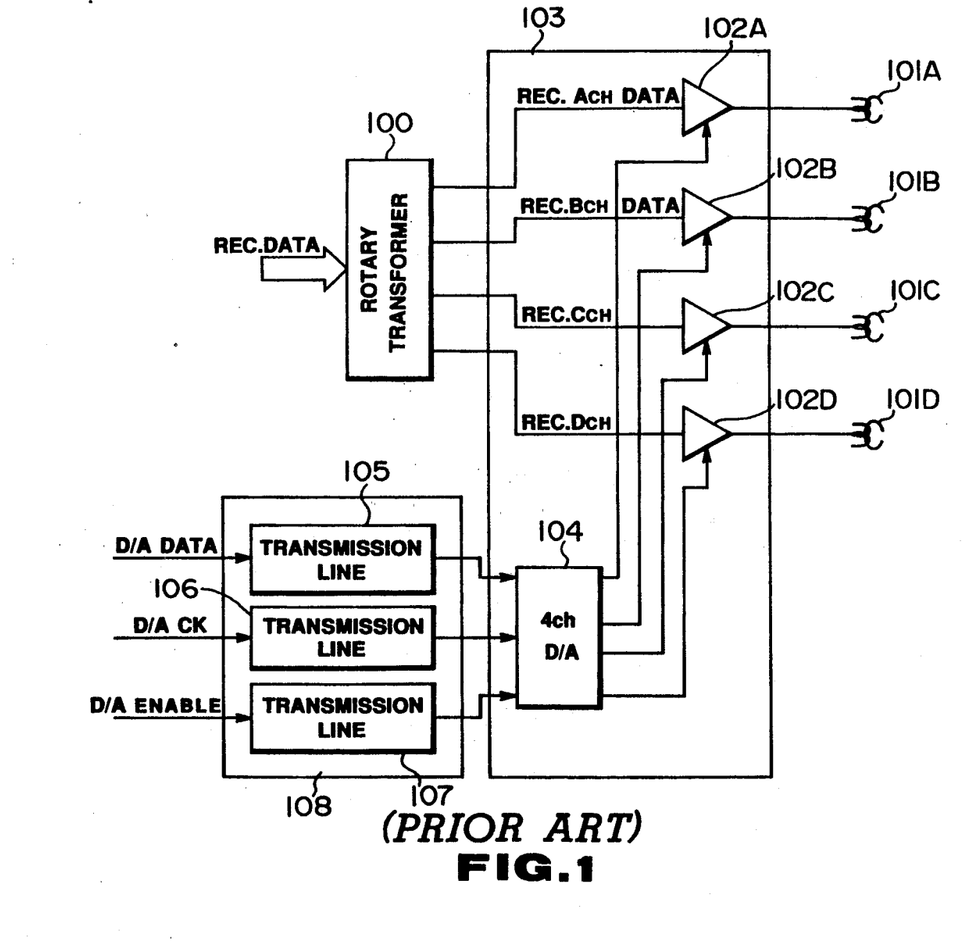
FIG. 1 is a block diagram showing the setup of a recording system for a conventional video tape recorder.

By way of illustration, FIG. 1 shows a recording system for a four channel digital video tape recorder in which a recording circuit 103 provided with four channel recording amplifiers (102A), (102B), (102C) and (102D) is provided on the rotary head drum side. These recording amplifiers amplify recording signals REC.A$_{CH}$DATA, REC.B$_{CH}$DATA, REC.C$_{CH}$DATA and REC.D$_{CH}$DATA for respective channels, transmitted from outside via a rotary transformer 100 as four channel recording signals REC.DATA, and supply the amplified signals to recording heads 101A, 101B, 101C and 101D for respective channels. In such recording system, there is provided a four-channel digital to analog (D/A) converter 104 in a recording circuit 103 on the rotary head drum side for forming gain control data CNT.A$_{CH}$, CNT.B$_{CH}$, CNT.C$_{CH}$ and CNT.D$_{CH}$ to perform channel-wise gain control of the recording amplifiers 102A, 102B, 102C and 102D. In this recording system, the gain control data CNT.A$_{CH}$, CNT.B$_{CH}$, CNT.C$_{CH}$ and CNT.D$_{CH}$ as well as data indicated by serial data D/A DATA, sync clock D/A CK and control signals D/A ENABLE therefor are transmitted from outside the rotary head drum to the rotary head drum side by way of transmission lines 105, 106, 107 provided in a slip ring device 108 to activate the D/A converter 104 on the basis of the sync clocks D/A CK and control signals D/A ENABLE to form the gain control data CNT.A$_{CH}$, CNT.B$_{CH}$, CNT.C$_{CH}$ and CNT.D$_{CH}$ from the data D/A DATA at the D/A converter 104 to perform gain control of each of the recording amplifiers 102A, 102B, 102C and 102D to effect recording control for each of the respective channels.

In general, in a serial data transmission system, when serial data are received at the receiving side by D-flip-flop or shift register, there are required clocks synchronized with these serial data or control signals indicating the start and stop points for the serial data. Thus the transmission line 105 for the serial data D/A DATA, the transmission line 106 for the sync clocks D/A CK and the transmission line 107 for the control signals D/A ENABLE are provided in parallel, as in the above mentioned recording system.

Figure 2:
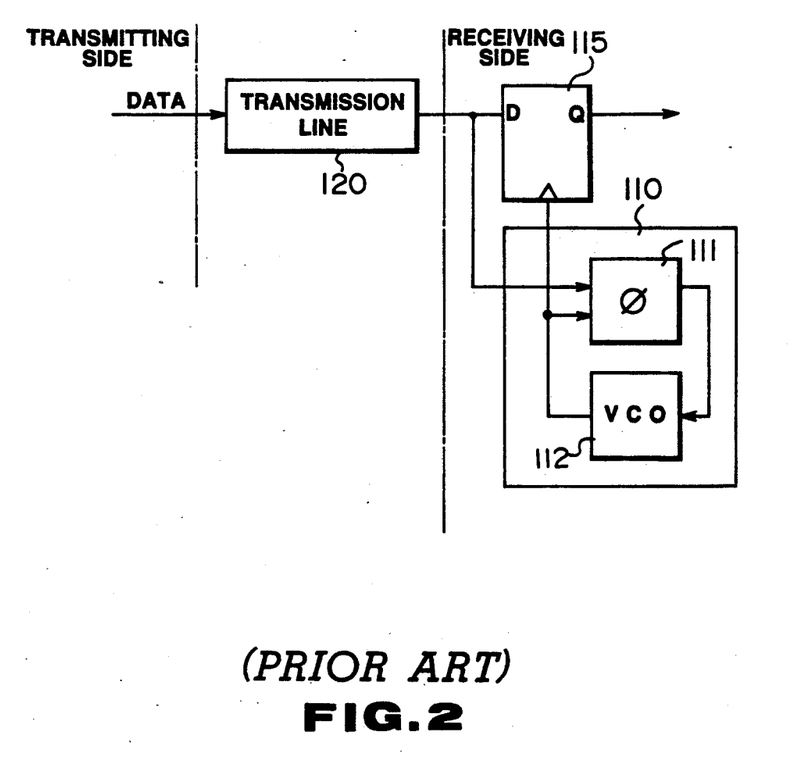
FIG. 2 is a block diagram showing the setup of the receiving side of the serial data transmission system.

In a so-called self-clock type transmission system in which clock signals are superimposed on the transmitted serial data, as shown in FIG. 2, a clock generator 110 by a phase locked loop (PLL) made up of a phase comparator 111 and a voltage controlled oscillator 112 is provided at the receiving side and the data edge phase of the serial data DATA transmitted from the transmitting side over a transmission line 120 is compared with the oscillating phase of the voltage controlled oscillator 112 at the phase comparator 111 to control the oscillating frequency of the voltage controlled oscillator 112 to form the sync clocks CK for the serial data DATA at the clock generator 110. These sync clocks CK are supplied to a clock input terminal of the D-flipflop 115 on the receiving side, while the serial data DATA are supplied to a data input terminal of the D-flipflop 115.

Heretofore, in a magnetic recording apparatus in which a recording circuit provided with an amplifier connected to the magnetic head is provided on the rotary head drum side, when the record control signals controlling the recording circuit are indicated by the serial data and data enable signals indicating data start and data end points of the serial data and these serial data and data enable signals are serially transmitted simultaneously with the sync clocks therefore, the serial data, data enable signals and the sync clocks are transmitted from outside the rotary head drum towards the rotary head drum over respective separate transmission lines, so that, with the use of ship ring devices as a transmission line, it is necessary to provide multistage slip ring devices, which in turn prove to be a hindrance to the reduction in size of the magnetic recording apparatus. The multistage slip ring devices are also inconvenient in that the torque of the drum motor adapted to cause rotation of the rotary head drum is thereby affected adversely and in that the S/N ratio is also lowered due to occasionally produced shaft oscillations.

Although the number of stages of the slip ring devices may be reduced by transmitting the serial data indicating the record control signals simultaneously with the sync clocks superimposed thereon, it is necessary in this case to provide the PLL type clock generator as described above on the receiving or rotary head drum side, so that a rather wide space need be set aside for this clock generator.

OBJECT OF THE INVENTION

It is an object of the present invention to reduce the size and improve the reliability of the magnetic recording apparatus in which a recording circuit provided with an amplifier connected to the magnetic head is provided on the rotary head drum side.

It is another object of the present invention to simplify a transmission system adapted to supply recording control signals from outside the rotary head drum to the recording circuit provided on the rotary head drum side.

It is a further object of the invention to provide a method for transmitting record control signals according to which record control signals for controlling the recording circuitry on the rotary head drum side in accordance with the various operating modes may be supplied over a sole transmission line simultaneously with the sync clocks.

It is still another object of the present invention to provide a record control circuit whereby complex control operations for the recording circuitry on the rotary head drum side can be performed from outside the rotary head drum as a function of various operating modes.

The above and other objects as well as novel features of the present invention will become more apparent upon reading the following description in conjunction with the accompanying drawings and the novel matter pointed out in the claims.

EMBODIMENT

An illustrative embodiment of the present invention will be explained hereinbelow by referring to the drawings.

Figure 3:
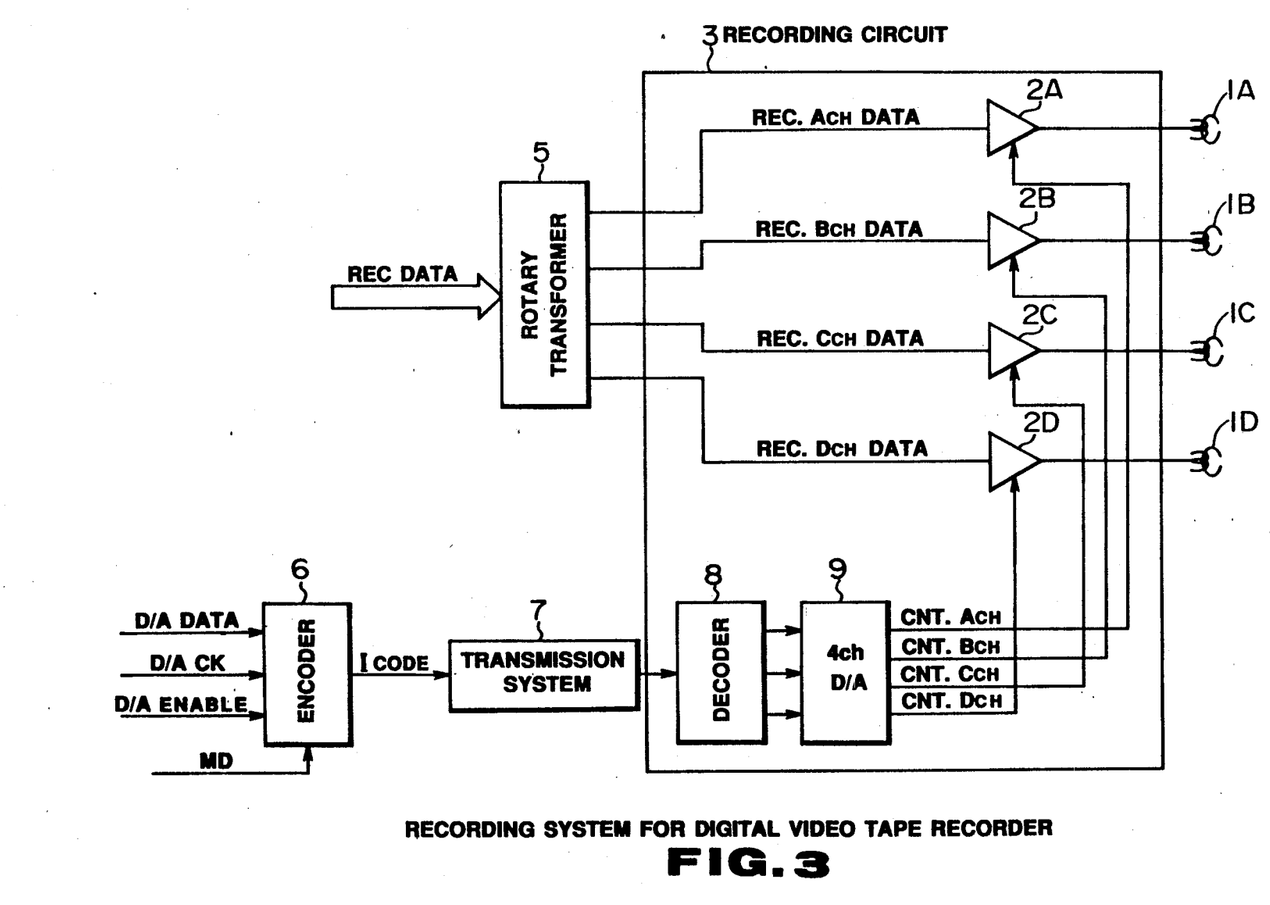
FIG. 3 is a block diagram showing the setup of the recording system of the video tape recorder according to the present invention.

The block diagram of FIG. 3 shows the setup of the recording system of the four-channel digital video tape recorder according to the present invention.

Figure 4:
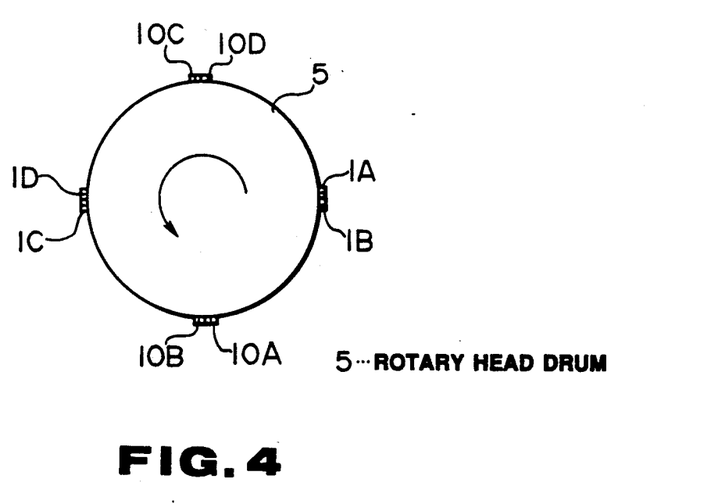
FIG. 4 is a schematic plan view showing the arrangement of each head of the rotary head drum of the recording system.

In the recorder system, shown in the block diagram of FIG. 3, a recording circuit 3 provided with four-channel recording amplifiers 2A, 2B, 2C and 2D connected respectively to four-channel recording heads 1A, 1B, 1C and 1D is provided in a rotary head drum 4 provided with the recording amplifiers 2A to 2D as shown in FIG. 4, and four-channel recording data REC.DATA are supplied to each of the recording amplifiers 2A to 2D via a rotary transformer 5. The recording circuit 3 is provided with a decoder 8 for decoding serial control signals supplied by way of a transmission system 7 from an encoder 6 provided outside the rotary head drum 4, and a four-channel digital to analog (D/A) converter 9 for forming gain control signals $CNT.A_{CH}$, $CNT.B_{CH}$, $CNT.C_{CH}$ and $CNT.D_{CH}$ for performing gain control of the respective recording amplifier 2A to 2D for the respective channels on the basis of the decoded output of the decoder 8.

Figure 5:
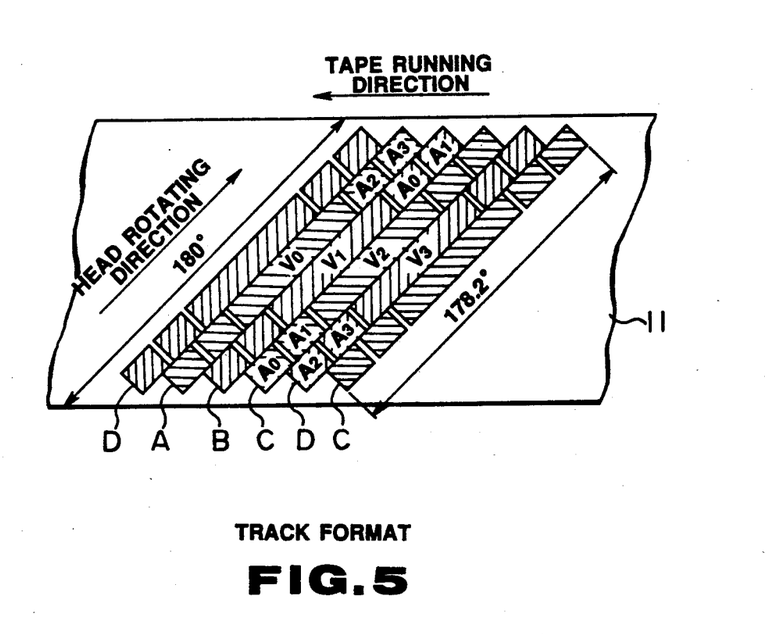
FIG. 5 is a schematic plan view showing the track format of the digital video tape recorder.

The digital video tape recorder according to the present invention is a so-called DII format digital video tape recorder and provided with a rotary head drum device comprised of a rotary head drum 4 provided in turn with a A-channel recording head 2A and a B-channel recording head 2B; and a C-channel recording head 2C and a D-channel recording head 2D, at an angular interval of 180° from each other; and a A-channel reproducing head 10A and a B-channel reproducing head 10B; and a C-channel reproducing head 10C and a D-channel reproducing head 10D, at an angular interval of 180° from each other, as shown in FIG. 4, wherein four-channel record data, that is, video data $V_0$, $V_1$, $V_2$ and $V_3$ and audio data $A_0$, $A_1$, $A_2$ and $A_3$ are azimuth recorded on the four-channel recording tracks A, B, C and D on the magnetic tape 11 by the recording tracks 1A to 1D in accordance with the track format shown in FIG. 5, while the four-channel signals are reproduced from the recording track A to D by the reproducing heads 10A to 10D.

According to the method for transmitting the record control signals according to the present invention, with the use of the above recording system, serial data D/A DATA indicating the gain control signals $CNT.A_{CH}$, $CNT.B_{CH}$, $CNT.C_{CH}$ and $CNT.D_{CH}$ for controlling the gains of the recording amplifiers 2A to 2D for the respective channels, data enable signals D/A ENABLE indicating the data start and data end points of the serial data D/A DATA, sync clocks D/A CK for the serial data D/A DATA, and the transmission mode signals MD, indicating the start and the end of the transmission, are supplied to the encoder 6, as the record control signals controlling the operation of the recording circuit 3, and the edge pulse of the sync clock D/A CK is gated at the encoder 6 by the data enable signals D/A ENABLE and supplied to the serial data D/A DATA, at the same time that the transmission mode signal MD indicating the start and the end of the transmission is summed to the serial data D/A DATA to form serial control data $I_{CODE}$, which are supplied over transmission system 7 to the decoder 8 provided in the recording circuit 3 on the side of the rotary head drum 5.

Figure 6:
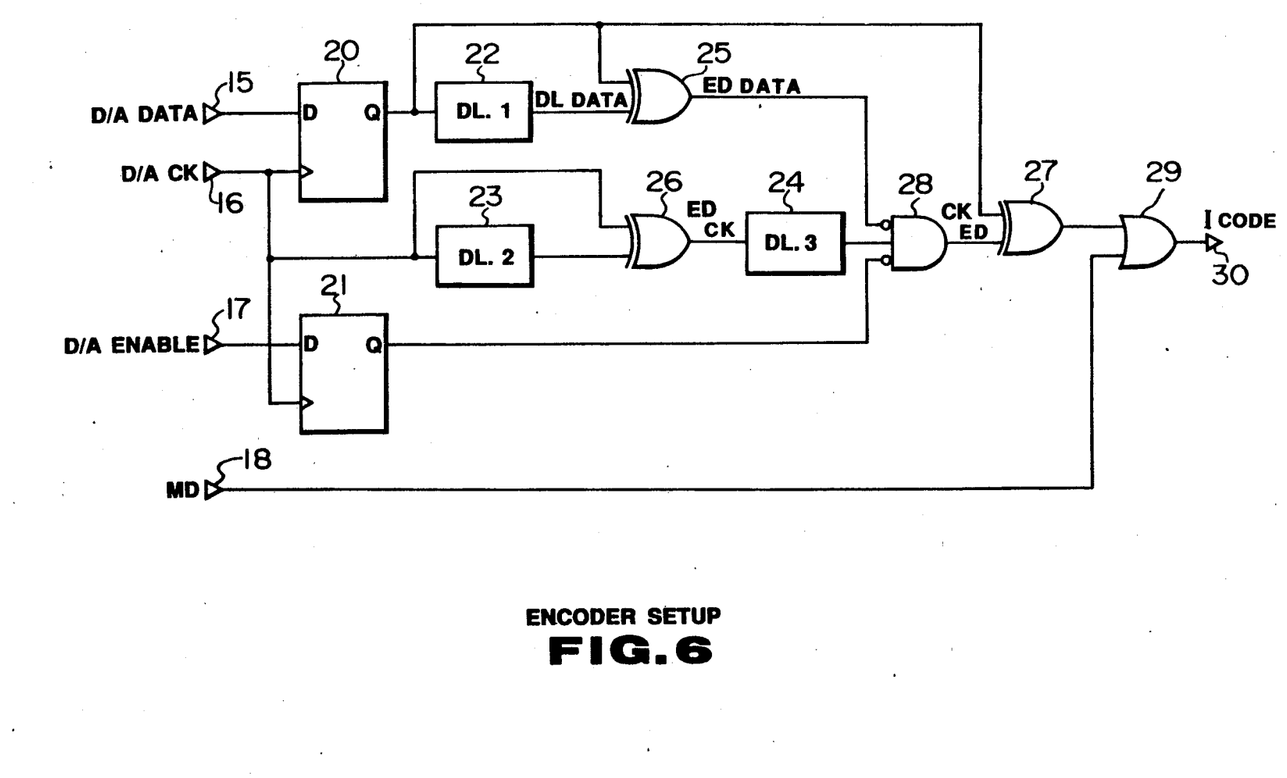
FIG. 6 is a circuit diagram showing an exemplary setup of an encoder employed for practicing the method of the present invention.

The encoder 6 for practicing the present invention is implemented in a circuit setup shown for example in FIG. 6.

The encoder 6 shown in the circuit diagram of FIG. 6 is made up of first and second D-flipflop 20, 21, first to third delay circuits 22, 23 and 24, first to third exclusive OR circuits 25, 26 and 27, a three-input AND circuit 28 and a two-input OR circuit 29.

The first D-flipflop 20 in the encoder 6 is so arranged and constructed that the serial data indicating the control signals to be transmitted, for example, the serial data D/A DATA indicating the gain control signals $CNT.A_{CH}$, $CNT.B_{CH}$, $CNT.C_{CH}$ and $CNT.D_{CH}$ for channel-wise gain control of the recording amplifiers 2A to 2D, are supplied to its data input terminal via signal input terminal 15, the sync clocks D/A CK of the serial data D/A DATA are supplied to its clock input terminal via clock input terminal 16 and that its Q output is directly supplied to one input terminals of the first and the third exclusive OR circuits 25, 27 while being supplied via first delay circuit 22 to the other input terminal of the first exclusive OR circuit 25. The exclusive OR output by the first exclusive OR circuit 25 is supplied to one input terminal of the three-input AND circuit 28.

The second D-flipflop 21 is so arranged and constructed that the data enable signal D/A ENABLE indicating the data start and data end points of the serial data D/A DATA are supplied via signal input terminal 17 to its data input terminal, the sync clocks D/A CK of the serial data D/A DATA are supplied via signal input terminal 16 to its clock input terminal and that its Q output is transmitted to the second input terminal of the three-input AND circuit 28.

The sync clocks D/A CK of the serial data D/A DATA are supplied via signal input terminal 16 to clock input terminals of the D-flipflops 20, 21, while being supplied to one input terminal of the second exclusive OR circuit 26 directly and to the other input terminal of the second exclusive OR circuit 26 via second delay circuit 23. The exclusive OR output by the second exclusive OR circuit 26 is supplied to the three input AND circuit 28 via third delay circuit 24.

The three-input AND circuit 28 has its first and the second input terminals as the inverting input terminals. The AND's output is derived from its three inputs of an inverted exclusive OR output from the first OR circuit 25, an inverted Q output of the second D-flipflop 21, and the second exclusive OR output 26 delayed by the third delay circuit 24.

The exclusive OR output by the third exclusive OR circuit 27 is supplied to one input terminal of the two-input OR circuit 29. The OR circuit 29 is so designed and constructed that the transmission mode signals MD indicating the start and the end of data transmission is supplied via signal input terminal 18 to the other input terminal and that the output of the third exclusive OR circuit 27 and the transmission mode signal MD is outputted at its signal output terminal 30 as the transmission data.

Figure 7:
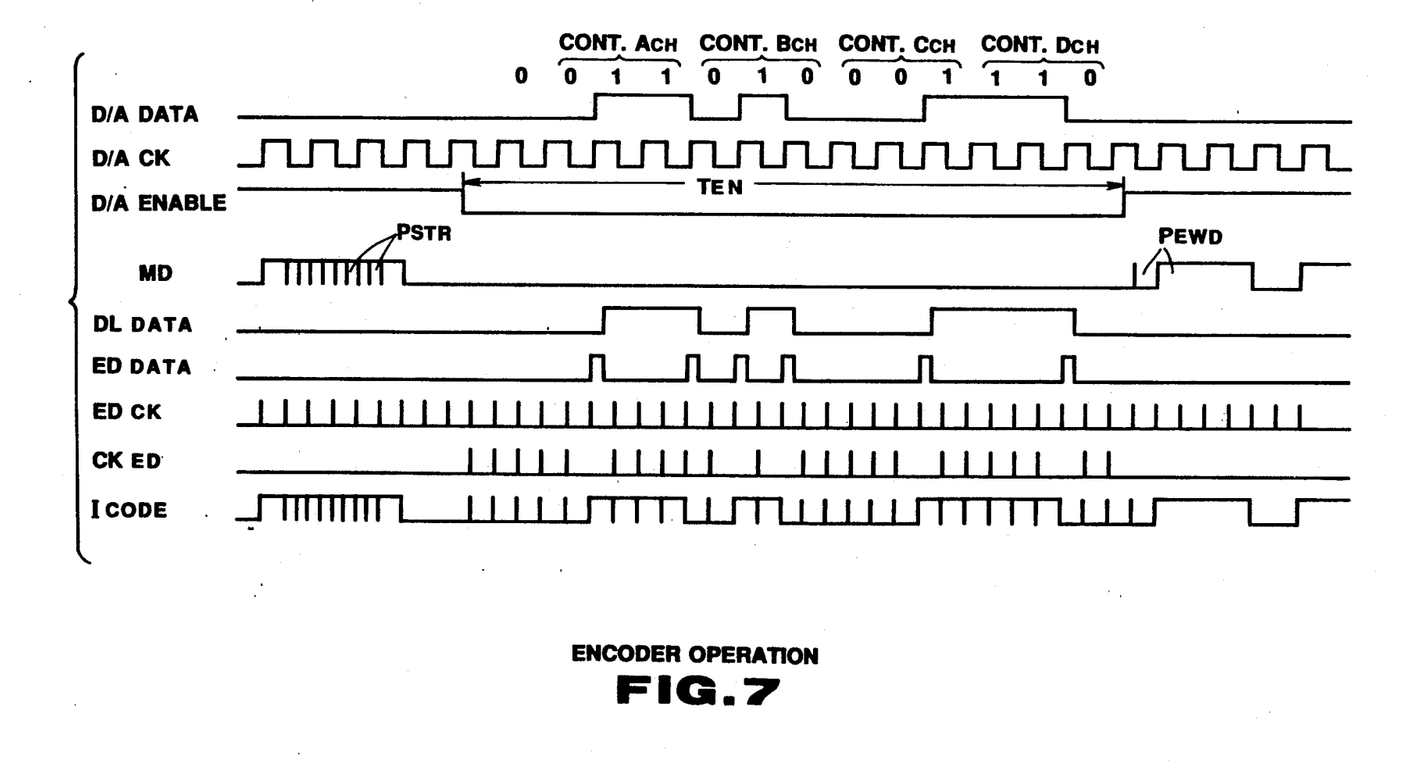
FIG. 7 is a timing chart showing the operation of the encoder.

In the above described encoder 6, when the serial data D/A DATA of, for example, 0011010001110, indicating the control signal to be transmitted, are supplied in synchronism with the sync clocks D/A CK during the time interval $T_{EN}$ intermediate the data start point and the data end point, indicated by the data enable signal D/A ENABLE, as shown for example in FIG. 7, data edge pulses $ED_{DATA}$ each indicating a data change point of the serial data D/A DATA are formed in the first exclusive OR circuit 25 as an exclusive OR output of the serial data D/A DATA entered via E-flipflop 20 as a Q output of the first D-flipflop 20 and the Q output $DL_{DATA}$ delayed by the first delay circuit 22. On the other hand, in the second exclusive OR circuit 26, clock edge pulses $ED_{CK}$, each indicating an edge of the sync clocks D/A CK, and formed as an exclusive OR output of the above sync clock D/A CK and a delayed output of the sync clock D/A CK delayed by the second delay circuit 23. The three-input AND circuit 28 outputs clock edge signals $CK_{ED}$, exclusive of the clock edges of the aforementioned data edge portions produced during the period $T_{EN}$ represented by the data enable signals D/A ENABLE, as an exclusive OR output of an inverted exclusive OR output of the first exclusive OR circuit 25, that is, an inverted data edge pulse $ED_{DATA}$, an exclusive OR output from the second exclusive OR circuit 26, that is, the aforementioned clock edge pulse $ED_{CK}$, delayed by the third delay circuit 24 and an inverted Q output of the second D-flipflop 21, that is, the aforementioned data enable signal D/A ENABLE inverted and delayed by one clock interval of the sync clock D/A CK. The third exclusive OR circuit 27 produces a signal which represents a superimposition of the clock edge signal $CK_{ED}$ produced in the three-input AND circuit 28 on the aforementioned serial data D/A DATA entered via the first D-flipflop 20. The OR circuit 29 produces a signal which represents the sum of the transmission mode signal MD having the start pulse $P_{STR}$ and the end pulse $P_{END}$ for data transmission to the signal produced in the third exclusive OR circuit 27 and transmits the summation signal at its signal output terminal 30 as the serial control signals $I_{CODE}$.

In the illustrative embodiment, eight start pulses $P_{STR}$ are afforded to the transmission mode signal MD for each of the transmitted data D/A DATA.

Figure 8:
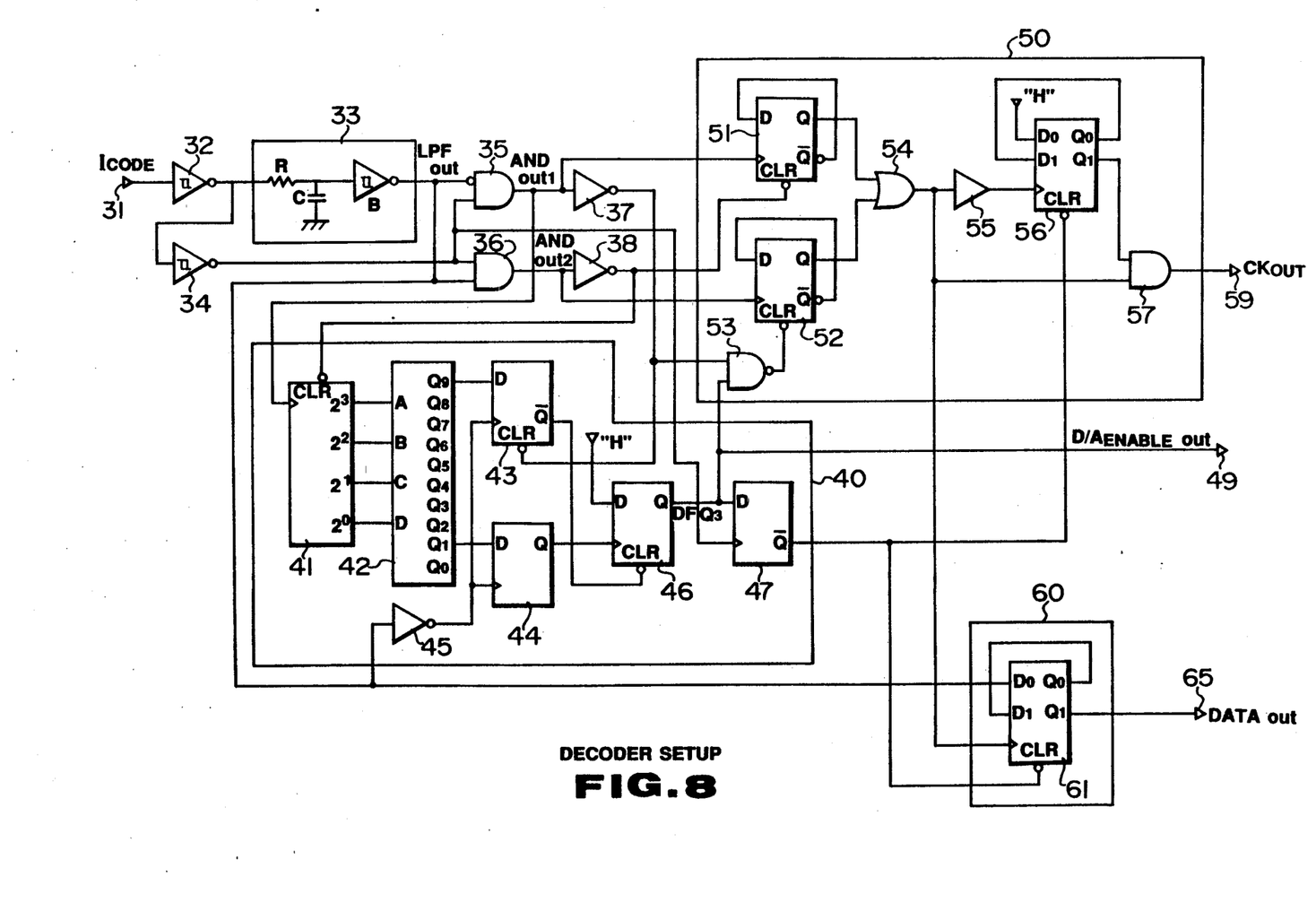
FIG. 8 is a circuit diagram showing an exemplary setup of a decoder associated with the encoder.

FIG. 8 shows an examplary setup of the decoder 8 provided in the recording circuit 3 on the side of the rotary head drum 5 to which the serial control signals $I_{CODE}$ produced at the encoder 6 are transmitted by way of the sole transmission system 7.

The decoder 8 shown in FIG. 8 is provided with a buffer circuit 32 to which the serial control signals $I_{CODE}$ are supplied via signal input terminal 31. The serial control signals $I_{CODE}$ are inverted in phase in the buffer circuit 32 before being supplied by way of a low-pass filter 33 to first and second AND circuits 35, 36.

The low-pass filter 33 is made up of a resistor R, condenser C and a buffer circuit B and transmits an output $LPF_{OUT}$ freed of the clock edge signals $CK_{ED}$ or the like contained in the serial control signals $I_{CODE}$ to an inverting input terminal of the first AND circuit 35, a non-inverting input terminal of the second AND circuit 36 and to a data latch circuit 60.

The serial control signals $I_{CODE}$ inverted in phase at the buffer circuit 32 is again inverted in phase via buffer circuit 34 before being transmitted to a non-inverting input terminal of the first AND circuit 35 and to an inverting input terminal of the second AND circuit 36.

The first AND circuit 35 extracts the clock edge signals $CK_{ED}$ or the like existing during the period the serial control signals $I_{CODE}$ are at the logical "L" level, as an AND output $AND_{OUT1}$ of the output $LPF_{OUT}$ of the low-pass filter 33 and the serial control signals $I_{CODE}$, and transmits the AND output $AND_{OUT1}$ to a clock input terminal of a counter 41 of a mode detection circuit 40 and to a clock input terminal of a first D-flipflop 51 of a clock demodulating circuit 50, while transmitting the aforementioned AND output $AND_{OUT1}$ to a clear input terminal of the first D-flipflop 43 of the mode detection circuit 40 and to one input terminal of a NAND circuit 53 of the clock demodulating circuit 50 via inverter 37.

The second AND circuit 36 extracts clock edge signals $CK_{ED}$ or the like existing during the period the serial control signals $I_{CODE}$ are at the logical "H" level, as the AND output $AND_{OUT2}$ taken of the output $LPF_{OUT}$ of the low-pass filter 33 and the serial control signal $I_{CODE}$, and transmits the AND output $AND_{OUT2}$ to a clock input terminal of a second D-flipflop 52 of the clock demodulating circuit 50, while transmitting the AND output $AND_{OUT2}$ to a clear input terminal of the first D-flipflop 51 of the clock demodulating circuit 50 via inverter 38.

The mode detection circuit 40 has a decoder 42 for decoding a count output of the counter 41 which is cleared by the AND output $AND_{OUT2}$ by the second AND circuit 36 to count the AND outputs $AND_{OUT1}$ from the first AND circuit 35. The mode detection circuit 40 is so arranged and constructed that a decoded output $Q_9$ of the decoder 42 which goes high when the count value of the counter 41 is equal to 9 is supplied to a decode input terminal of the first D-flipflop 43 and that a decoded output $Q_1$ of the decoder 42 which goes high when the count value of the counter 41 is equal to 1 is supplied to the data input terminal of the second D-flipflop 44.

The output $LPF_{OUT}$ of the aforementioned low-pass filter 33 is supplied via inverter 45 to each clock input terminal of the D-flipflops 43 and 44.

Figure 9:
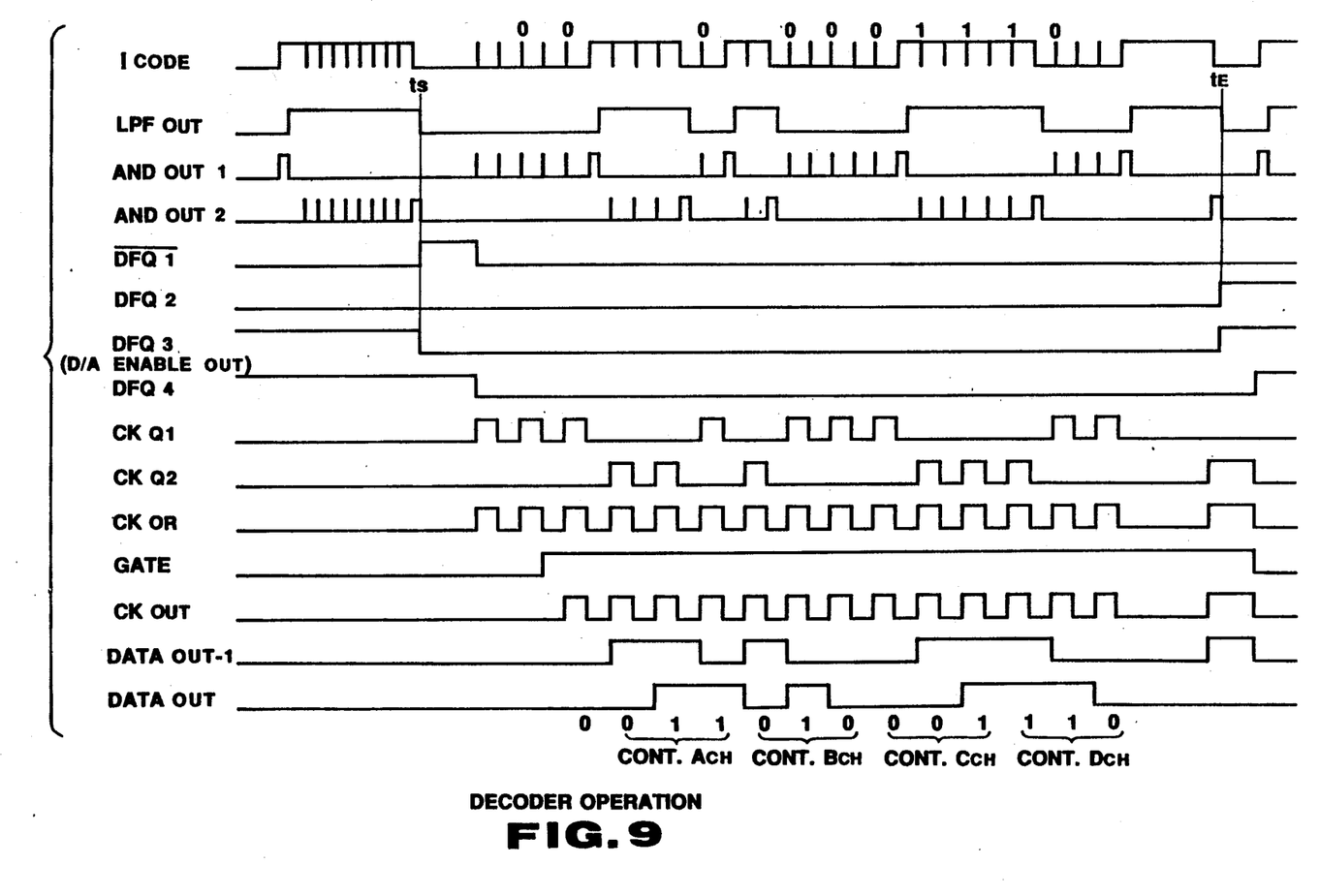
FIG. 9 is a timing chart for illustrating the operation of the decoder.

The first D-flipflop 43 latches a decode output $Q_9$, outputted from the decoder 42 each time the counter 41 counts nine pulses consisting of eight start pulses $P_{STR}$, supplied as the transmission mode signal MD for each transmission data, and an edge pulse $ED_{LPF}$ of an output $LPF_{out}$ of the low-pass filter 33, at the timing $t_s$ of the falling edge of the output $LPF_{OUT}$ of the low-pass filter 33, and transmits a $\overline{Q}$ output $\overline{DFQ_1}$ which goes low until the time that the D-flipflop 43 is cleared by the AND output $AND_{OUT1}$ from the first AND circuit 35 to a clear input terminal of a third D-flipflop 46.

The second D-flipflop 44 latches a decoded high level output $Q_1$ which is outputted from the decoder 42 at the timing $t_E$ of the falling edge of the end pulse $P_{END}$ supplied for each transmitted data as the aforementioned transmission mode signal MD and transmits the Q output $DFQ_2$ to the clock input terminal of the third D-flipflop 46.

The third D-flipflop 46 is perpetually supplied at its data input terminal with the logically high level data and is cleared by the $\overline{Q}$ output $\overline{DFQ_1}$ of the first D-flipflop 43 at the timing $t_s$ of the falling edge of the output $LPF_{OUT}$ of the low-pass filter 33 to supply a Q output $DFQ_3$, which goes low only during the period $T_{SE}$ until the time the logically high level data is latched at the timing $t_E$ of the falling edge of the end pulse $P_{END}$ by the Q output $DFQ_2$ of the second D-flipflop 44, to the data input terminal of the fourth D-flipflop 47 and to the other input terminal of the NAND circuit 53 of the clock demodulating circuit 50, while outputting the aforementioned Q output $DFQ_3$ at the signal output terminal 49 as the data enable signals D/A ENABLE-$_{OUT}$.

The fourth D-flipflop 47 is supplied at its clock input terminal with the aforemetioned serial control signals $I_{CODE}$ from the buffer circuit 34 and latches the Q output $DFQ_3$ of the third D-flipflop 46 at the timing of the falling edge of the serial control signal $I_{CODE}$ to supply its Q output to respective clear input terminals of a third D-flipflop 56 of the clock demodulating circuit 50 and a D-flipflop 61 of the data latch circuit 60.

The first D-flipflop 51 of the clock demodulating circuit 50 has its $\overline{Q}$ output terminal connected to its data input terminal and performs frequency halving of the AND output $AND_{OUT1}$ supplied by the first AND circuit 35 to its clock input terminal as the D-flipflop 51 is cleared by the AND output $AND_{OUT2}$ from the second AND circuit 36. The second D-flipflop 52 is connected at its $\overline{Q}$ output terminal to a data input terminal and supplied at its clear input terminal with the output of the NAND circuit 53. The D-flipflop 52 performs frequency halving of the AND output $AND_{OUT2}$ of the second AND circuit 36 supplied to its clock input terminal, as the D-flipflop 52 is cleared by the AND output $AND_{OUT1}$ from the first AND circuit 35 and by the $\overline{Q}$ output $\overline{DFQ_3}$ from the third D-flipflop 53 of the mode detection circuit 40, that are supplied to the clear input terminal of the D-flipflop 52 as the output of the NAND circuit 53 supplied with these output signals.

The frequency halved outputs $CK_{Q1}$ and $CK_{Q2}$, obtained as the Q outputs of the D-flipflops 51 and 52, are supplied by way of an OR circuit 54 to one input terminal of the AND circuit 57 and to a clock input terminal of the D-flipflop 61 of the data latch circuit 60, while being simultaneously supplied by way of OR circuit 54 and inverter 55 to a clock input terminal of the third D-flipflop 56.

The third D-flipflop 56 is perpetually supplied with a logically high level data it its first data input $D_0$ and has its first data output terminal $Q_0$ connected to its second data input terminal $D_1$. The third D-flipflop 56 transmits a gate control signal GATE, which goes logically high each time two rising edges of clock pulses $CK_{OR}$ are counted from the OR circuit 54 via inverter 55, from the second data output terminal $Q_1$ to one of input terminals of the AND circuit 57, to cause the AND gate 57 to output a number of sync clocks $CK_{OUT}$ coincident with the number of the transmission data at the signal output terminal 59.

The D-flipflop 61 of the data latch circuit 60 has its first data output terminal $Q_0$ connected to its second data input terminal $D_1$ and operates to latch twice the output $LPF_{OUT}$ of the low-pass filter 33 supplied to its first data input terminal $D_0$ with the clock pulses $CK_{OR}$ supplied from the OR circuit 54 of the clock demodulating circuit 50 to shift the outputs rearwards by one clock to output control data $DATA_{OUT}$ coincident in timing with the sync clocks $CK_{OUT}$ demodulated at the clock demodulating circuit 50 at the signal output terminal 65.

The aforementioned D/A converter 9, supplied with the control data $DATA_{OUT}$, data enable signals D/A ENABLE and sync clocks $CK_{OUT}$, obtained by decoding the serial control signals $I_{CODE}$ from the encoder 6 by the decoder 8, performs a D/A conversion of the control data $DATA_{OUT}$, on the basis of the data enable signals D/A $ENABLE_{OUT}$ and the sync clocks $CK_{OUT}$ to form the gain control signals $CNT.A_{CH}$, $CNT.B_{CH}$, $CNT.C_{CH}$ and $CNT.D_{CH}$ for each channel to effect channel-wise gain control of the recording amplifiers 2A to 2D by these gain control signals $CNT.A_{CH}$, $CNT.B_{CH}$, $CNT.C_{CH}$ and $CNT.D_{CH}$.

In the above described digital video tape recorder, gain control signals $CNT.A_{CH}$, $CNT.B_{CH}$, $CNT.C_{CH}$ and $CNT.D_{CH}$, in accordance with the aforementioned serial control signals $I_{CODE}$ transmitted from the encoder 6, are formed at the D/A converter 9 provided in the recording circuit 3 provided in turn in the rotary head drum 4, to effect a channel-wise gain control of the recording amplifiers 2A to 2D, to perform variable adjustment of the recording current for each channel by the abovementioned serial control signals $I_{CODE}$ transmitted from outside to the rotary head drum 4. Data may similarly transmitted to perform an control operation of independently re-writing the recording data for each channel, that is, video data $V_0$, $V_1$, $V_2$ and $V_3$ and audio data $A_0$, $A_1$, $A_2$ and $A_3$, for setting the decoder in each of the various modes so as to perform a control operation such as insert edit recording.

Although the operational mode of performing the gain control operation for the recording amplifiers 2A to 2D by the D/A converter 9 has been exclusively described in the illustrative embodiment, it is also possible to designate a reproducing mode, recording mode or a test mode for checking the operation of the recording/reproducing mode to perform various control operations by changing the number of start pulses $P_{STR}$ annexed as the abovementioned mode control signal MD to the serial transmission data for indicating the start of transmission.

On the other hand, when a reproducing amplifying circuit is provided within the rotary head drum in addition to the recording circuit, the above described method may be employed to control the reproducing amplifying circuit besides the recording circuit to select the reproducing channel.

It will be appreciated from the foregoing that the present invention provides a method for transmitting record control signals, according to which the record control signals for controlling the operation of the recording circuit provided on the rotary head drum side of the magnetic recording/reproducing apparatus and provided with the amplifier connected to the magnetic head are indicated by the serial data and the data enable signals indicating the data start point and the data end point of the serial data, the edge pulse of the sync clock of the serial data is gated by the data enable signals and annexed to the serial data, and the record control signals are serially transmitted from outside the rotary head drum to the side of the rotary head drum as the serial control signals comprised of the serial transmission data to which are annexed the transmission mode signals indicating the start and the end of transmission. Thus the record control signals may be supplied from outside to the rotary head drum over a sole transmission line simultaneously with the sync clocks or the like to simplify the transmission system for the record control signals. Also, in the record control circuit of the present invention, record control signals for the recording circuit are formed by control signal forming means on the basis of the data enable signals and sync clocks transmitted to the head drum side simultaneously with the serial transmission data indicating the record control signals as the serial control data to control the operation of the recording circuit, so that it is possible to supply the record control signals from outside to the rotary head drum over a sole transmission line along with the sync clocks to perform a complex control operation as a function of various operating modes.

Hence, according to the present invention, it becomes possible to improve the reliability and reduce the size of the magnetic recording apparatus in which the recording circuit provided with an amplifier connected to the magnetic head is provided on the side of the rotary head drum, while allowing to perform a complex control operation of the recording circuit.

What is claimed is:

1. In a magnetic recording apparatus in which a recording circuit, provided with an amplifier connected to a magnetic head, is provided on the side of a rotary head drum, a method for transmitting record control signals supplied to said recording circuit, comprising
    indicating said record control signals by serial data and data enable signals indicating data start and data end points of said serial data,
    gating the edge pulses of sync clocks for said serial data with said data enable signals and annexing the gated edge pulses to said serial data, and further annexing transmission mode signals indicating the start and the end of transmission to said serial data to form serial control signals, and
    serially transmitting the record control signals as the serial control signals from outside said rotary head drum to the side of said rotary head drum.

2. In a magnetic recording apparatus in which a recording circuit, provided with an amplifier connected to a magnetic head, is provided on the side of a rotary head drum, a record control circuit for controlling said recording circuit comprising
    serial control signal generating means provided outside said rotary head drum and outputting record control signals as serial control signals, in which the record control signals controlling said recording circuit are indicated by serial data and data enable signals indicating data start and data end points of said serial data, edge pulses of sync clocks for said serial data are gated with said data enable signals and annexed to said serial data and in which transmission mode signals indicating the start and the end of transmission are further annexed to the serial data,
    signal transmitting means for transmitting serial control signals from said serial control signal generating means into said rotary head drum, and
    control signal forming means provided on the side of said rotary head drum and forming the record control signals for said recording circuit from the serial control signals transmitted by way of said signal transmitting means.

3. The record control circuit according to claim 2 wherein said serial control signal generating means comprises
    edge detecting means for detecting edges of said serial data,
    gating means for gating the edge pulses of said sync clocks with edge detecting pulses detected by said edge detecting means and with said data enable signals, and
    an exclusive OR gate supplied with the gate output pulses produced by said gating means and with said serial data.

4. In a magnetic recording apparatus in which a recording circuit, provided with an amplifier connected to magnetic head, is provided on the side of a rotary head drum, a record control circuit for controlling said recording circuit comprising
    serial control signal generating means provided outside said rotary head drum and outputting record control signals as serial control signals, in which the record control signals controlling said recording circuit are indicated by serial data and data enable signals indicating data start and data end points of said serial data, edge pulses of sync clocks for said serial data are gated with said data enable signals and annexed to said serial data and in which transmission mode signals indicating the start and the end of transmission are further annexed to the serial data,
    signal transmitting means for transmitting serial control signals from said serial control signal generating means into said rotary head drum, and
    control signal forming means provided on the side of said rotary head drum and forming the record control signals for said recording circuit from the serial control signals transmitted by way of said signal transmitting means,
    wherein said control signal forming means comprises low-pass filter means for removing edge pulse components annexed to said serial control signals, first and second gating means controlled by the output of said low-pass filter means in opposite phase to each other to separate the edge pulses annexed to said serial control signals, data enable signal forming means for forming data enable signals from each of the edge pulses obtained at each of said first and second gating means and the output of said low-pass filter means, said data enable signals indicating data start and data end points of the serial data indicating said record control signals, clock demodulating means for demodulating the sync clocks for said serial data from each of the edge pulses obtained at said first and second gating means and from data enable signals obtained at said data enable signal forming means, and data latching means for forming serial data synchronized with said sync clocks from the output of said low-pass filter means, the data enable signals obtained at said data enable signal forming means, and the sync clocks obtained at said clock demodulating means.

* * * * *